(12) United States Patent
Ludwig et al.

(10) Patent No.: US 12,468,872 B2
(45) Date of Patent: Nov. 11, 2025

(54) LOW VOLUME FILLING OF A LIQUID INTO A CONTAINER

(71) Applicant: HOFFMANN-LA ROCHE INC., Little Falls, NJ (US)

(72) Inventors: Imke Sonja Ludwig, Basel (CH); Joerg Luemkemann, Basel (CH); Julien Boeuf, Mannheim (DE); Tim Dreckmann, Basel (CH)

(73) Assignee: HOFFMANN-LA ROCHE INC., Little Falls, NJ (US)

( * ) Notice: Subject to any disclaimer, the term of this patent is extended or adjusted under 35 U.S.C. 154(b) by 1014 days.

(21) Appl. No.: 17/616,035

(22) PCT Filed: Jun. 5, 2020

(86) PCT No.: PCT/EP2020/065584
§ 371 (c)(1),
(2) Date: Dec. 2, 2021

(87) PCT Pub. No.: WO2020/245330
PCT Pub. Date: Dec. 10, 2020

(65) Prior Publication Data
US 2022/0300685 A1    Sep. 22, 2022

(30) Foreign Application Priority Data
Jun. 7, 2019    (EP) ..................................... 19179146

(51) Int. Cl.
*G06F 30/28*    (2020.01)
*G06F 111/10*    (2020.01)
(Continued)

(52) U.S. Cl.
CPC .......... *G06F 30/28* (2020.01); *G06F 2111/10* (2020.01); *G06F 2113/08* (2020.01); *G06F 2119/14* (2020.01)

(58) Field of Classification Search
CPC ... G06F 30/28; G06F 2119/14; G06F 2111/10
(Continued)

(56) References Cited

U.S. PATENT DOCUMENTS

2008/0246945 A1    10/2008    Heinzelmann et al.
2015/0351376 A1*   12/2015    Wichmann .......... A01M 7/0092
                                                        700/283
(Continued)

FOREIGN PATENT DOCUMENTS

JP    2011143314 A    7/2011
WO    2007112033 A2   10/2007

OTHER PUBLICATIONS

Notice of Reasons for Rejection issued Aug. 27, 2024 in Japanese Patent Appl. No. 2021-572421.
(Continued)

*Primary Examiner* — Md Azad
(74) *Attorney, Agent, or Firm* — MEDLER FERRO WOODHOUSE & MILLS PLLC (57) ABSTRACT

A process of assembling a filling system for low volume filling of a liquid into a container is disclosed. The process includes obtaining plural liquid forwarding devices configured to provide the liquid from a reservoir to the container, and simulating operation of each of the liquid forwarding devices by numerically modelling flow patterns of the liquid when being forwarded by the liquid forwarding devices, and by determining a shear stress rate for each of the liquid forwarding devices based on the modelled flow patterns. The process further includes determining an appropriateness for each of the liquid forwarding devices by comparing operation parameters of the liquid forwarding of the liquid forwarding devices, wherein the operation parameters include the determined shear stress rates, selecting the liquid forwarding device having the highest determined appropriate-
(Continued)

ness, and installing the selected liquid forwarding device into the filling system.

15 Claims, 3 Drawing Sheets

(51) Int. Cl.
*G06F 113/08* (2020.01)
*G06F 119/14* (2020.01)

(58) Field of Classification Search
USPC .......................................................... 700/283
See application file for complete search history.

(56) References Cited

U.S. PATENT DOCUMENTS

| | | | |
|---|---|---|---|
| 2019/0330584 A1* | 10/2019 | Rathbone | C12M 23/16 |
| 2020/0355605 A1* | 11/2020 | Causey, III | A61B 5/157 |
| 2021/0223082 A1* | 7/2021 | Bernacki | G01F 13/006 |
| 2022/0097876 A1* | 3/2022 | Galas, Jr. | B65B 39/12 |

OTHER PUBLICATIONS

Yuichi Murai et al., Internal Flow of an Inscribed Trochoid Gear Pump at Low Reynolds Numbers (Evaluation of Pumping Characteristics with 3-D Numerical Simulation); Transactions of the Japan Society of Mechanical Engineers B, vol. 70, No. 695, pp. 1754-1761, Jul. 25, 2004.

Ursula Johanna Bausch, "Impact of Filling Processes on Protein Solutions", Jan. 1, 2008, pp. 1-135, XP055654033, Basel, URL:https://pdfs.semanticscholar.org/04fa/42d1e887713d4688284f58f08141fb330f29.pdf?_ga=2.95154648.519589117.1576679875-3625549 43.1568041556.

Fraser et al., "The Use of Computational Fluid Dynamis in the Development of Ventricular Assist Devices", Medical Engineering & Physics, Butterworth-Heinemann, GB, vol. 33, No. 3, Oct. 15, 2010, pp. 263-280, XP028172326, ISSN: 1350-4533, DOI: 10.1016/J.MEDENGPHY.2010.10.014.

C R et al., "Effects of Shear on Proteins in Solution", Biotechnology Letters, Springer Netherlands, Dordrecht, vol. 33, No. 3, Nov. 18, 2010 (Nov. 18, 2010), pp. 443-456, XP019883182,ISSN: 1573-6776, DOI:10.1007/S10529-010-0469-4.

Joshua O et al., 1 Analysis of Transitional and Turbulent Flow Through the FDA Benchmark Nozzle Model Using Laser Doppler Velocimetry, Cardiovascular Engineering and Technology, Springer US, Boston, vol. 7, No. 3, Jun. 27, 2016 (Jun. 27, 2016), pp. 191-209, XP036038312, ISSN: 1869-408X, DOI: 10.1007/S13239-016-0270-1.

International Search Report (ISA/210) for International Patent Application No. PCT/US2020/065584 issued/mailed by the European Patent Office on Sep. 7, 2020.

Written Opinion of the International Searching Authority (ISA/237) for International Patent Application No. PCT/US2020/065584 issued/mailed by the European Patent Office on Sep. 7, 2020.

\* cited by examiner

LOW VOLUME FILLING OF A LIQUID INTO A CONTAINER

TECHNICAL FIELD

The present invention relates to a process of assembling a filling system for low volume filling of a liquid into a container, a computer implemented method of evaluating a liquid forwarding device for a filling system for low volume filling of a liquid into a container, and a respective computer program.

BACKGROUND ART

On an industrial level filling low volumes of liquids can be challenging in a desired accurate, efficient and precise manner. Particularly, when comparably demanding liquids are involved, such as pharmaceutical or drug substances and particularly parenterals, low volume filling can involve high needs to the filling procedure. Thereby, properties of the liquid, like viscosity or sensitivity of the involved drug to physical stress, can make it difficult to efficiently fill low volumes at a desired accuracy.

For example, today intravitreal ocular treatment substances for diseases, such as wet age-related macular degeneration (AMD) or diabetic macular edema, are typically filled with more volume than required due to the lack of a filling system capable of accurately and precisely filling of the drug substance in industrial processes. Like this, it is aimed to ensure that a sufficient amount of the drug substance can be administered to a patient. However, although overfilling is a common practice, it also has numerous disadvantages such as medication errors due to wrong dosing, misuse of leftover product, or waste of drug substance. To encounter some of these disadvantages, pre-filled syringes filled with the desired fill volume in the range of 50-100 microliters ($\mu$l) are used as alternative to vials.

More specifically, e.g. when intravitreal administration is involved, the presence of particles at a visible and non-visible scale may be inhibitive for the application of a drug substance. Thus, it is desired to ensure that no such particles are present in the final product. However, particularly when biological or biochemical drugs are involved, e.g. comprising antibodies like monoclonal antibodies, the formation of particles during filling of the drug substance into the vials or other containers may occur. Thereby, depending on the conditions the drug substances are exposed to while being filled, particularly while being pumped or similarly driven, the antibodies or other proteins may more or less form particles or aggregates.

For identifying a suitable filling system and particularly a suitable pump or similar liquid forwarding device, it is common to compare various filling systems to each other. Thereby, the resulting filled drug substance is analysed, e.g., as to the presence of particles. Since such particle formation may occur quite a long time after filling but still be traced back to the filling system, the drug substances have to be long-term studied. Thus, the definition or setting up and assembling of filling systems is comparably laborious, time consuming and causes undesired waste product.

Therefore, there is a need for a process or system allowing to assemble and identify a filling system for filling low volumes of liquids, particularly liquid drug substances, in an industrial process.

DISCLOSURE OF THE INVENTION

According to the invention this need is settled by a process of assembling a filling system for low volume filling of a liquid into a container as it is defined by the features of independent claim 1, and by a computer implemented method of evaluating a liquid forwarding device for a filling system for low volume filling of a liquid into a container as it is defined by the features of independent claim 13. Preferred embodiments are subject of the dependent claims.

In one aspect, the invention is a process of assembling a filling system for low volume filling of a liquid into a container. The process comprises the steps of (i) obtaining plural liquid forwarding devices configured to provide the liquid from a reservoir to the container; (ii) simulating operation of each of the liquid forwarding devices by numerically modelling flow patterns of the liquid when being forwarded by the liquid forwarding devices, and by determining a shear stress rate for each of the liquid forwarding devices based on the modelled flow patterns; (iii) determining an appropriateness for each of the liquid forwarding devices by comparing operation parameters of the liquid forwarding of the liquid forwarding devices, wherein the operation parameters include the determined shear stress rates; (iv) selecting the liquid forwarding device having the highest determined appropriateness; and (v) installing the selected liquid forwarding device into the filling system.

The liquid can particularly be a liquid drug substance. The low volume filling can particularly be a filling under aseptic conditions as it is often required when liquid drug substances are involved.

The term "drug" as used herein relates to a therapeutically active agent, also commonly called active pharmaceutical ingredient (API), as well as to a combination of plural such therapeutically active substances. The term also encompasses diagnostic or imaging agents, like for example contrast agents (e.g. MRI contrast agents), tracers (e.g. PET tracers) and hormones, that need to be administered in liquid form to the patient.

The term "drug substance" as used herein relates to a drug as defined above formulated or reconstituted in a form that is suitable for administration to the patient. For example, besides the drug, a drug substance may additionally comprise an excipient and/or other auxiliary ingredients. A particularly preferred drug substance in the context of the invention is a drug solution, in particular a solution for administration by injection or infusion.

The drug substance can be a parenteral drug substance. More specifically, it can be an intravitreal drug substance which typically is particularly sensitive for the presence of particles, aggregations or other affections. For example, the drug substance can be formulated for an intravitreal treatment of an ocular disease such as wet age-related macular degeneration (AMD) or diabetic macular edema.

The drug substance can further be a biological or biochemical drug substance, or any high concentrated formulation. Often such drug substances include proteins such as antibodies like monoclonal antibodies. Typically, such drug substances are administered at comparable small dosages or low volumes. Also, such drug substances often have a comparably high viscosity and are comparable prone for mechanical stress.

The term "drug product" can relate to a finished end product comprising a drug substance or a plurality of drug substances. In particular, a drug product may be a ready to use product having the drug substance in an appropriate dosage and/or in an appropriate form for administration. For example, a drug product may include an administration device such as a prefilled syringe or the like.

The term "low volume" as used herein relates comparably small volumes of the liquid to be filled. In particular, such low volume can be the volume of a drug to by parenterally or intravitreally administered. Such low volume can be a volume of below about 200 microliter (µl), of about 100 µl or less, or of about 50 µl or less. When pre-filled syringes are involved, the low volume can be in a range of about 50 µl to about 100 µl.

The reservoir can be any containment or any other structure housing the liquid. In particular, the reservoir can be embodied to make the liquid available. Therefore, it can be equipped with a tube, a pipe, a tank, any combination thereof or the like.

The container can be any container suitable or desired for further processing or handling the liquid. In case the liquid is a drug substance, the container can be a vial or an administering device such as a syringe or the like. In particular, the container can be a pre-filled syringe which houses a predefined dosage of a liquid drug substance.

The liquid forwarding devices can be pumps or pump like devices. For example, pumps suitable for dosing liquids at low volumes can be rotary piston pumps, radial peristaltic pumps or linear peristaltic pumps.

The obtaining of the plural liquid forwarding devices can involve the physical making available or providing of all devices involved or of samples thereof. Additionally or alternatively, it can involve the making available or providing of data or information about the single physical devices. For example, obtaining the plural liquid forwarding devices can be embodied by providing drawings or technical drawings about the devices allowing for gathering all information required for the simulation such as the dimensions and the like. Thus, obtaining of the plural liquid forwarding devices can also be referred to as obtaining information or data about the physical forwarding devices. Typically, for the simulation, it is important to have at least information about the geometry of the liquid forwarding devices.

Numerically modelling is a proven method used to solve theoretical fluid properties. Such numerical modelling allows for efficiently investigating the shear stress rates during liquid forwarding by the various liquid forwarding devices.

The shear stress rate can be any measure or dimension indicative for the extent of the shear or shear stress the liquid is exposed to in the liquid forwarding device. It can be or comprise a physical unit, a numerical value composed of physical units or values or the like. Furthermore, the shear stress rate can also be a cumulative shear stress rate indicative for the total shear stress the liquid is exposed to while being provided, forwarded or processed by the respective liquid forwarding device.

The appropriateness can be a cumulative appropriateness indicative for the total process of the liquid being provided by the respective liquid forwarding device. The term "having the highest appropriateness" in connection with selecting the liquid forwarding device is not limited to having the highest numerical value or the like. Rather, depending on the determination of the appropriateness applied, the highest appropriateness can also be represented by a lowest numerical value, by a color, by a sound, or by any other measure or signal allowing identification of the most appropriate liquid forwarding device. The highest appropriateness can be a measure or dimension allowing for rating the liquid forwarding devices involved. Appropriateness can alternatively be referred to as suitability or applicability.

In the context of the invention, it has been found that besides requirements such as filling accuracy, cleaning-in-place/sterility-in-place (CIP/SIP) compatibility and materials with a low extractable and leachable profile, the shear stress to which the liquid is exposed during filling has an important effect on the formation of particles in the liquid during filling the liquid into the container. Shear stress is present in almost all bioprocesses and has been found to play a role in protein aggregation and denaturation of proteins which may be susceptible to shear stress. Looking at the extensive portfolio within the pharmaceutical industry, protein-based products are a significant part of the pipeline, both in the present and the future. Thereby, particularly when involving direct administration into the human eye (intravitreal), control and analysis of key parameters during aseptic filling is required. For selecting the most appropriate liquid forwarding device, it is important to understand how the devices' filling mechanism may affect the stability of the liquid or drug substance.

The particles to prevent in the liquid can be visible or sub-visible, i.e. smaller than about 2 microns. For example, in the field of drug substances and particular intravitreal drug substances, it is pivotal to prevent such particle formation. And particularly drug substances comprising proteins such as antibodies often have a comparably low resistance for shear stress such that the shear stress to which the proteins are exposed damages the proteins which promotes the formation of particles such as aggregates. Therefore, involving the shear stress in evaluation of a given environment allows for efficiently selecting the most appropriate liquid forwarding device. More specifically, by considering the shear stress rate determined by simulating operation of the liquid forwarding devices allows for a particular efficient, fast and resource saving selection of the most suitable liquid forwarding device for a specific low volume filling procedure. Like this, a filling facility for filling the liquid into the containers on an industrial scale can economically and reliably designed and set up.

The simulation of the technical process of operation of the liquid forwarding devices and particularly its numerical modelling of the flow patterns allows to qualify the liquid forwarding devices which serves as basis to select the most appropriate liquid forwarding device in the given situation. Like this, performing test cycles and stability studies for selecting the liquid forwarding device are not required such that waste of the liquid in the test cycles can be prevented and the performance or efficiency of the selection can be essentially enhanced. In particular, the higher the number of considered liquid forwarding devices is and/or the more valuable the liquid to fill is, the more important these effects can be.

Preferably, operation of each of the liquid forwarding devices is simulated by applying computational fluid dynamics (CFD). CFD as a branch of fluid mechanics typically uses numerical analysis and data structures to analyze and solve problems that involve fluid flows. Commonly, computers are used to perform the calculations required to simulate the free-stream flow of the fluid, and the interaction of the fluid (liquids and gases) with surfaces defined by boundary conditions.

Thereby, the CFD preferably comprise a Navier-Stokes equation, an Euler equation, a Stokes equation, a potential equation or a combination thereof. Such CFD allow for an efficient and accurate modelling of the operation of each of the liquid forwarding devices.

Besides the determined shear stress rates, the operation parameters can comprise parameters relating to dosing precision, dosing speed, stability or robustness of the liquid forwarding devices, maintenance effort, cleaning-in-place or sterility-in-place compatibility or the like.

Preferably, simulating operation of each of the liquid forwarding devices comprises defining moving parts of the liquid forwarding devices as general moving objects. Thereby, numerically modelling flow patterns preferably comprises defining displacement over time of the general moving objects. Such simulation allows for achieving a comparably high processing speed and preciseness.

Preferably, simulating operation of each of the liquid forwarding devices comprises defining pressure boundary conditions at liquid inlets of the liquid forwarding devices and at liquid outlets of the liquid forwarding devices. Like this, the limits of the simulation can efficiently be set to a suitable range.

Preferably, the operation parameters comprise liquid characteristics. By means of such liquid characteristics the operation of filling the container with liquid can efficiently be simulated. In particular, since many filling systems highly depend on the characteristics of the liquid to be filled, such process allows for an accurate simulation of the given situation.

Thereby, the liquid characteristics preferably comprise a viscosity. Viscosity often is one of the key characteristics influencing the filling process. This can particularly be the case when liquids having a comparably high viscosity such as liquid drug substances comprising proteins are involved.

Alternatively or additionally, the liquid characteristics preferably comprise an indicator of a sensitivity of the liquid. The sensitivity of the liquid can also be given by a substance contained therein. The sensitivity can for example be an indicator for a threshold force a component of the liquid such as an antibody is capable of withstanding without being harmed or damaged. The sensitivity can also be referred to as fatigue of the liquid.

Preferably, the highest determined appropriateness is or is promoted by the lowest shear rate. Such process allows for a straightforward and efficient implementation suitable when the shear rate is the dominant characteristics or parameter for deciding on the particular liquid forwarding device.

Preferably, the liquid forwarding devices comprise a piston pump and/or a peristaltic pump. Such pumps may be particularly suitable for forwarding low volumes of the liquid at a desired accuracy and performance.

Preferably, obtaining plural liquid forwarding devices comprises providing geometry data of each of the liquid forwarding devices. Such obtaining step allows for efficiently integration into the numerical modelling. In particular, the geometry data can directly be used in the numerical modelling.

Thereby, simulating operation of each of the liquid forwarding devices preferably comprises mapping the determined shear stress rates to a geometry of each of the liquid forwarding devices represented by the provided geometry data. Such mapping allows for an efficient simulation.

Further, simulating operation of each of the liquid forwarding devices preferably comprises classifying the determined shear stress rates and distributing the classified shear stress rates. This, again, allows for achieving an efficient simulation.

Preferably, an elastic part of any one of the liquid forwarding devices is simulated as a further liquid having a comparably high viscosity. Such elastic part can be a silicone or similar tubing. For example, such tubings are often used in peristaltic pumps. By simulating the elastic part as the further liquid, its properties and particularly its elasticity can efficiently be modelled.

In another aspect, the invention is a computer implemented method of evaluating a liquid forwarding device for a filling system for low volume filling of a liquid into a container. The computer implemented method comprises: obtaining forwarding device data of plural liquid forwarding devices configured to provide the liquid from a reservoir to the container; evaluating the obtained forwarding device data to simulate operation of each of the liquid forwarding devices by numerically modelling flow patterns of the liquid when being forwarded by the liquid forwarding devices, and by determining a shear stress rate for each of the liquid forwarding devices based on the modelled flow patterns; determining an appropriateness for each of the liquid forwarding devices by comparing operation parameters of the liquid forwarding of the liquid forwarding devices, wherein the operation parameters include the determined shear stress rates; and providing an appropriateness indicator data signal representing the liquid forwarding device having the highest determined appropriateness.

The term "computer" as used herein can relate to any suitable computing device such as a laptop computer, a desktop computer, a server computer, a tablet, a smartphone or the like. The term covers single devices as well as combined devices. A computer can, for example, be a distributed system, such as a cloud solution, performing different tasks at different locations.

A computer typically may involve a processor or central processing unit (CPU), a permanent data storage having a recording media such as a hard disk, a flash memory or the like, a random access memory (RAM) and a read only memory (ROM). It can further have a communication adapter such as an universal serial bus (USB) adapter, a local area network (LAN) adapter, a wireless LAN (WLAN) adapter, a Bluetooth adapter or the like, and a physical user interface such as a keyboard, a mouse, a touch screen, a screen, a microphone, a speaker or the like. Computers can be embodied with a broad variety of components.

The term "data signal" as used herein can relate to a measurable or determinable physical quantity or unit or a sequence of such quantities or units, which is configured to represent an information or data. Particularly, a signal can be an electric voltage or potential, an acoustic pressure, an electromagnetic wave, a field force, a sequence or any combination thereof, which can be physically transferred over a point-to-point or point-to-multipoint communication channel. Such channels may be copper wires, optical fibers, wireless communication channels, storage media and computer buses. In any case, signals or data signal are recordable or conceivable and distinctly determinable. Data signals can be binary data signals, digital electronic signals, electromagnetic signals or combinations thereof. They can represent specific data particularly organized in accordance with a specific protocol. The data itself can be a digital bit stream or the like which represents physical and/or logical conditions and changes or the like. It can particularly be in a format accessible and evaluatable by the computer executing the method.

The term "represent" in connection with signals or data signals can relate to a presence of an information. Thereby, this term does not exclude that aside of the explicitly mentioned information also other information is comprised in the signal or data signal. For example, a data signal can represent an information by being conditioned in a specific manner, such that the information can be recollected or determined from the data signal.

The computer implemented method and its preferred embodiments described below allow for efficiently achieving the effects and benefits of the process according to the invention and its preferred embodiments described above. In particular, the computer implemented method can be embodied in a fully automated manner such that an efficient and accurate operation can be achieved at a high performance.

Preferably, obtaining the forwarding device data comprises receiving a device data signal for each of the forwarding devices.

Simulating operation of each of the liquid forwarding devices preferably comprises applying CFD. Thereby, the CFD preferably comprise a Navier-Stokes equation, an Euler equation, a Stokes equation, a potential equation or a combination thereof.

Preferably, simulating operation of each of the liquid forwarding comprises defining moving parts of the liquid forwarding devices as general moving objects. Thereby, numerically modelling flow patterns preferably comprises defining displacement over time of the general moving objects.

Preferably, simulating operation of each of the liquid forwarding comprises defining pressure boundary conditions at liquid inlets of the liquid forwarding devices and at liquid outlets of the liquid forwarding devices.

Preferably, the operation parameters comprise liquid characteristics. Thereby, the liquid characteristics preferably comprise a viscosity. Additionally or alternatively, the liquid characteristics preferably comprise an indicator of a sensitivity of the liquid.

Preferably, the highest determined appropriateness is or is promoted by the lowest shear rate. The liquid forwarding devices preferably comprise a piston pump and/or a peristaltic pump.

Preferably, the forwarding device data comprises geometry data of each of the liquid forwarding devices. Thereby, simulating operation of each of the liquid forwarding devices preferably comprises mapping the determined shear stress rates to a geometry of each of the liquid forwarding devices represented by the provided geometry data. Additionally or alternatively, simulating operation of each of the liquid forwarding devices preferably comprises classifying the determined shear stress rates and distributing the classified shear stress rates.

Preferably, an elastic part of any one of the liquid forwarding devices is simulated as a further liquid having a comparably high viscosity.

In a further other aspect, the invention is a computer program comprising instructions which, when the computer program is executed by a computer, cause the computer to carry out the computer implemented method described above.

The computer program can be a computer program product comprising computer code means configured to control a processor of a computer to implement the computer implemented method or any of its preferred embodiments described above or below when being executed on the computer. Further, there can be provided a computer readable medium comprising instructions which, when executed by a computer, cause the computer to carry out the method or any of its preferred embodiments described above or below. The medium can a storage medium and, for allowing a convenient distribution, a mobile or portable storage medium. Or, for allowing a transfer over the Internet or the like, or for other purposes, there can be provided a data carrier signal carrying the computer program described herein before. The computer program can also be referred to as or comprised by a software.

The computer program according to the invention and its preferred embodiments allow for efficiently achieving the benefits and effects of the computer implemented method and its preferred embodiments described above.

BRIEF DESCRIPTION OF THE DRAWINGS

The invention is described in more detail herein below by way of exemplary embodiments and with reference to the attached drawings, in which.

DESCRIPTION OF EMBODIMENTS

In the following description certain terms are used for reasons of convenience and are not intended to limit the invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
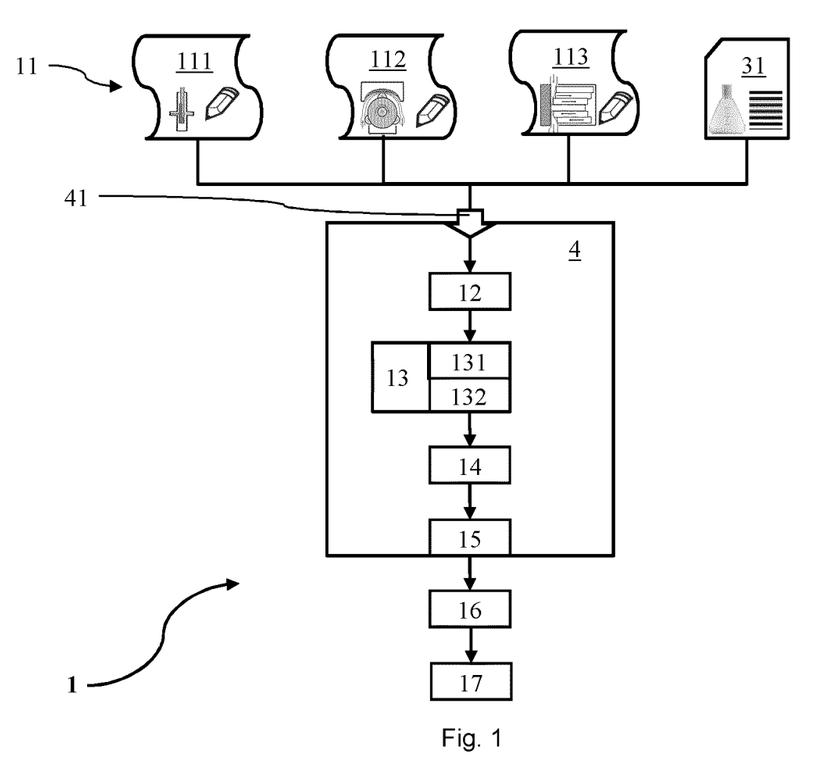
FIG. 1 shows a flow scheme of an embodiment of a process according to the invention involving a computer running an embodiment of a computer program for executing an embodiment of a computer implemented method according to the invention.

FIG. 1 shows an embodiment of a process 1 of assembling a filling system for low volume filling of a liquid 3 into a container according to the invention. The process 1 involves a computer running an embodiment of a computer program 4 executing an embodiment of a computer implemented method according to the invention.

The process 1 comprises a step 12 of obtaining three pumps 11 as liquid forwarding devices. The pumps 11 are configured to provide the liquid from a reservoir to the container. More specifically, piston pump technical drawing data 111, radial peristaltic pump technical drawing data 112 and linear peristaltic pump technical drawing data 113 represented by respective data signals are transferred to the computer via an interface 41 implemented by the computer program 4. Furthermore, liquid characteristics data 31 comprising characteristic of the liquid 3 such as its viscosity and sensitivity represented by a respective data signal is transferred to the computer via the interface 41.

In a step 13 of the process 1 implemented by the computer program 4 operation of each of the pumps 11 is simulated by numerically modelling flow patterns of the liquid 3 when being forwarded by the liquid forwarding devices, and by determining a shear stress rate for each of the pumps 11 based on the modelled flow patterns.

More specifically, the obtained technical drawing data 111, 112, 113 and the obtained liquid characteristics data 31 are evaluated by the computer program to simulate operation of each of the pumps 11 by applying computational fluid dynamics (CFD) as the numerically modelling of the flow patterns of the liquid 3 when being forwarded by the pumps 11, and by the determining of the shear stress rate for each of the pumps 11.

In a first sub-step 131 operation of each of the pumps 11 modelled by defining moving parts of the pumps 11 as general moving objects. Thereby, displacement over time of the general moving objects is defined.

FIG. 1 shows an embodiment of a process 1 of assembling a filling system for low volume filling of a liquid 3 (see FIG. 2) into a container according to the invention. The process 1 involves a computer running an embodiment of a computer program 4 executing an embodiment of a computer implemented method according to the invention.

The process 1 comprises a step 12 of obtaining three pumps 11 as liquid forwarding devices. The pumps 11 are configured to provide the liquid from a reservoir to the container. More specifically, piston pump technical drawing data 111, radial peristaltic pump technical drawing data 112 and linear peristaltic pump technical drawing data 113 represented by respective data signals are transferred to the computer via an interface 41 implemented by the computer program 4. Furthermore, liquid characteristics data 31 comprising characteristic of the liquid 3 (see FIG. 2) such as its viscosity and sensitivity represented by a respective data signal is transferred to the computer via the interface 41.

In a step 13 of the process 1 implemented by the computer program 4 operation of each of the pumps 11 is simulated by numerically modelling flow patterns of the liquid 3 (see FIG. 2) when being forwarded by the liquid forwarding devices, and by determining a shear stress rate for each of the pumps 11 based on the modelled flow patterns.

More specifically, the obtained technical drawing data 111, 112, 113 and the obtained liquid characteristics data 31 are evaluated by the computer program to simulate operation of each of the pumps 11 by applying computational fluid dynamics (CFD) as the numerically modelling of the flow patterns of the liquid 3 (see FIG. 2) when being forwarded by the pumps 11, and by the determining of the shear stress rate for each of the pumps 11.

In a step 17 of the process 1, the selected one of the pumps 11 is installed into the filling system. Like this, in an efficient manner the most appropriate filling system in a given situation can be set up.

Figure 2:
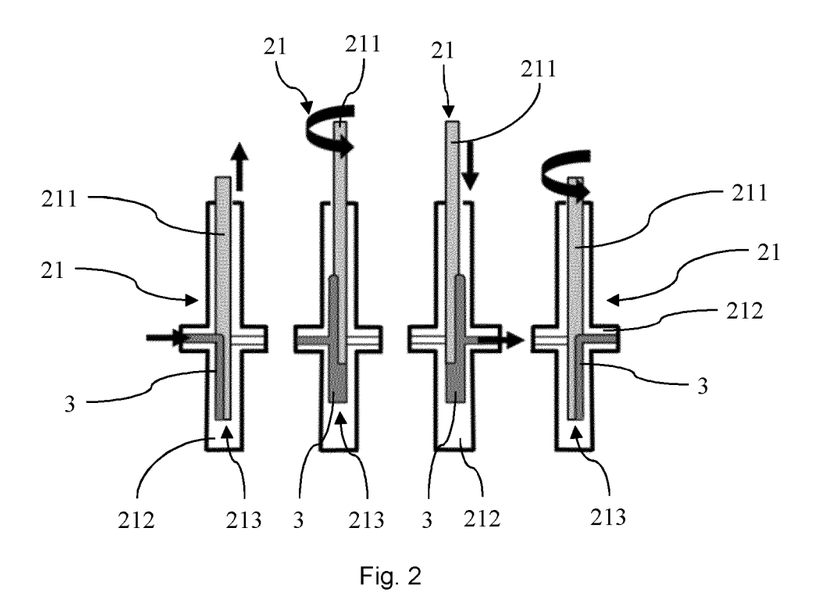
FIG. 2 shows a schematic view of a piston pump involved in the process and computer implemented method of FIG. 1.

As examples, the three pumps 11 involved in the process 1 and the computer implemented method shown in FIG. 1 are explained in more detail below. In particular, FIG. 2 shows a rotary piston pump 21, wherein four consecutive positions are depicted from left to right. The piston pump 21 has an essentially cross-shaped housing 212 with a left-hand liquid inlet and a right hand liquid outlet. A rod-like piston 211 is vertically received in the housing 212.

In the left most drawing of FIG. 2, the liquid inlet is open such that the liquid 3 flows from a reservoir into an interior 213 of the housing 212. As indicated by the arrow this liquid flow is induced by upwardly moving the piston 211 thereby sucking the liquid 3 from the reservoir into the interior 213.

As indicated with the arrow in the second drawing from the left end of FIG. 2, after the interior 213 of the housing 212 being filled, the piston 211 is rotated by 180° about its longitudinal axis such that the liquid inlet is closed and the liquid outlet is opened instead.

As indicated with the arrow in the second drawing from the right end of FIG. 2, the piston is then moved vertically downwards such that the liquid 3 is pressed out of interior 213 through the liquid outlet into a container.

As indicated with the arrow in the right most drawing of FIG. 2, after the piston is fully moved downward it is turned by 180° again such that the liquid outlet is closed and the liquid inlet is opened. The process can now be restarted.

In each cycle of piston 211 movement as described herein before, an accurately predefined amount or dosage of the liquid 3 is forwarded out of the liquid outlet. Like this, the liquid can precisely be dosed into the container.

The piston pump 21 can be used specifically for high precision aseptic filling since the fill volume can be adjusted in a very precise manner. The piston pump 22 is limited to a designated range of dosage, therefore different pump sizes may be needed if a certain range of fill volumes should be covered. Generally, piston pumps are often used because of their high filling accuracy and precision, particularly for low fill volumes such as ≤0.3 ml.

Figure 3:
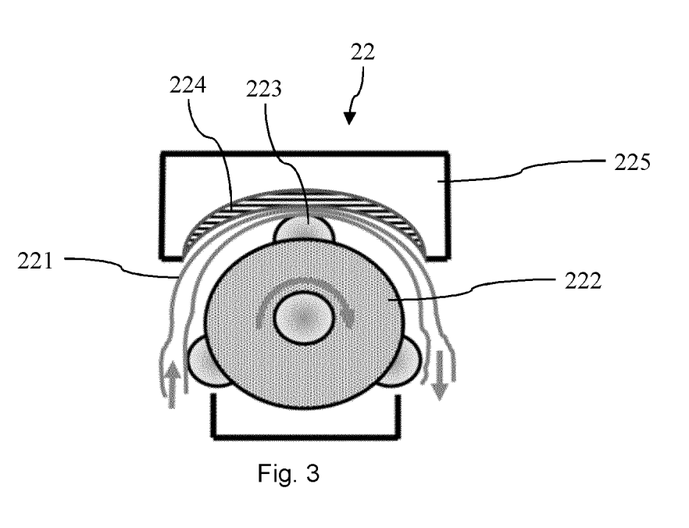
FIG. 3 shows a schematic view of a radial peristaltic pump involved in the process and computer implemented method of FIG. 1.

In FIG. 3 a radial peristaltic pump 22 is shown. The radial peristaltic pump 22 comprises a tubing 221 with a left hand liquid inlet and a right hand liquid outlet, a housing 225 and a rotor 222. The housing 225 forms a stator with a semi-circular counter pressure part 224. The tubing 221 is positioned in between the rotor 222 and the counter pressure part 224. The counter pressure part 224 is adjustable to adapt a distance to the rotor 222 in order allow tubings of various sizes to be used. The rotor 222 is equipped with three rollers 223 regularly distributed around its circumference.

For forwarding the liquid from the liquid inlet to the liquid outlet, the rotator 222 turns clockwise. Thereby, the rollers 223 squeeze the tubing 221 to the counter pressure part 224 such that the liquid is moved clockwise through the tubing 221. Given by the distance between the rollers 223, the diameter of the tubing 221 and elasticity of the tubing 222 the radial peristaltic pump 22 allows for precisely forwarding predefined volumes or dosages of the liquid through the liquid outlet.

An advantage of the radial peristaltic pump 22 is the fact that the liquid is only in direct contact with the tubing 222 and not with other portions of the pump 22. This allows to minimize potential extractables, leachables and presence of particulates. However, use of tubing material which is suitable for aseptic fill finish processes and, hence, having the capability of being cleaned and sterilized under 121° C. and 2 bar pressure may be of high importance. Additionally, there are restrictions concerning leachables, extractables and particle shedding into the fluid which have to be considered.

Figure 4:
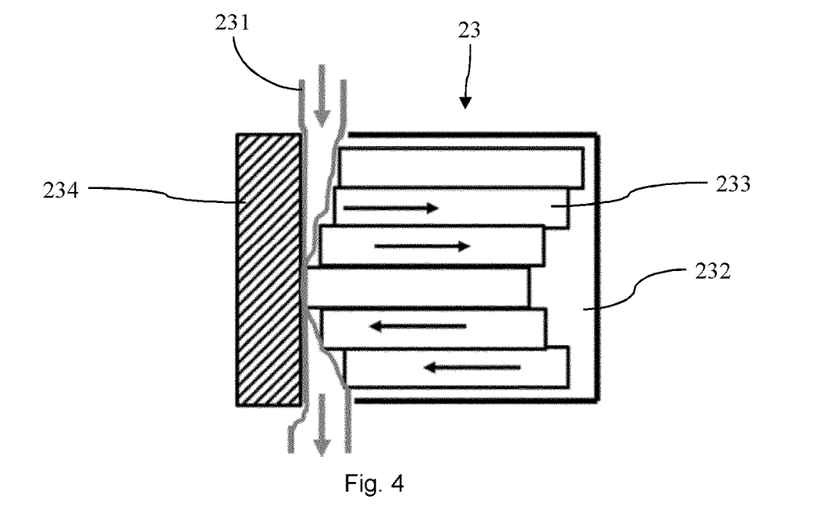
FIG. 4 shows a schematic view of a linear peristaltic pump involved in the process and computer implemented method of FIG. 1.

FIG. 4 shows a linear peristaltic pump 23 having a housing 232, a counter pressure plate 234 and six linear piezo-actuators 233. Between the piezo-actuators 233 and the counter pressure plate 234 a tubing 231 vertically extends. The piezo-actuators 233 can be horizontally moved back and forth. By alternatingly moving the piezo-actuators 233, a liquid is forwarded from a top liquid inlet of the tubing 231 to a liquid outlet of the tubing 231. More specifically, the linear peristaltic pump 23 can be operated as described in WO 2016/012567 A1.

The fill volume of linear peristaltic pump 23 may be controlled directly by the amount of cycles, the number of the displaced piezo-actuators 233, the actuator size, the pre-compression of the tubing by the counter pressure plate 234 and the elasticity of the tubing 231. Due to the orthogonal movement and the lack of tangential force vectors, compared to radial peristaltic pumps, there may be less relative movement of the tubing inner surfaces resulting in less material strain and less particle shedding.

Figure 5:
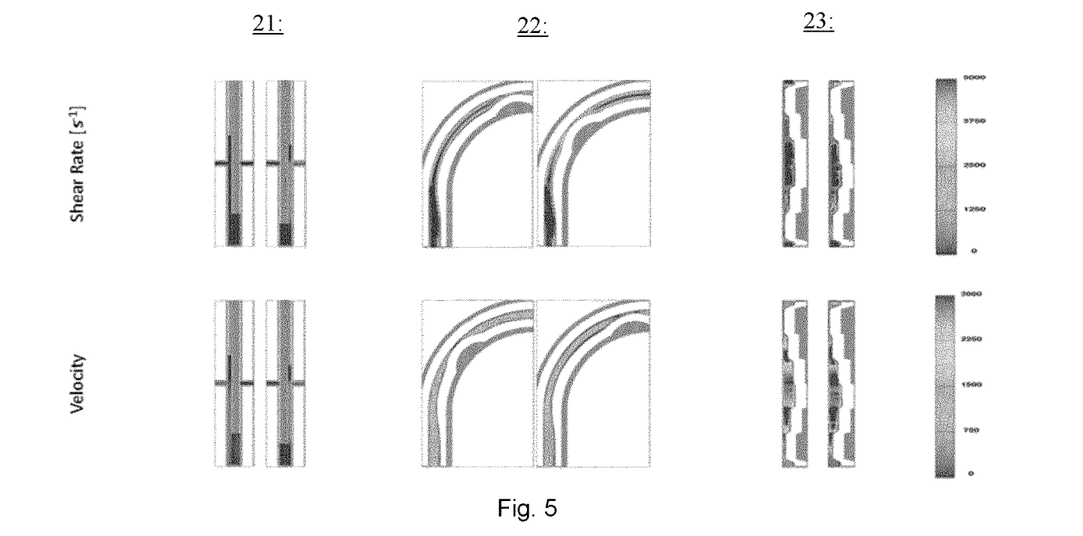
FIG. 5 shows a graphical appropriateness indicator generated within the process and computer implemented method of FIG. 1.

In FIG. 5 graphical appropriateness indicators represented by the appropriateness indicator data signals provided in step 15 described above are shown. More specifically, based on the technical drawing data 111, 112, 113 of each one of the pumps 11, velocity and shear rate during low volume aseptic filling is simulated. FIG. 5 shows the shear rate and the corresponding fluid velocities for two consecutive states of motion in the different pumps 11. This analysis allows an estimation regarding shear rate levels during low volume filling depending on the pump type.

As can be seen in FIG. 5, the shear rate in the radial peristaltic pump 22 is approximately ten to twenty times higher compared to the piston pump 21. The CFD analysis shows the highest shear rates from the linear peristaltic pump 23. This observation is based on high fluid velocities being induced by the rapid movement of the six piezo-actuators 233 inside the linear peristaltic pump 23.

This description and the accompanying drawings that illustrate aspects and embodiments of the present invention should not be taken as limiting the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below. For example, it is possible to operate the invention in an embodiment where further parameters are used in the simulation in addition to the shear rates.

In fact, as experimentally verified, one particular protein containing liquid used in the pumps 11 for validating the simulation showed the highest subvisible particle counts after piston pump 21 even though the shear rates are of the other two pumps are higher. Therefore, the effect of interspaces on protein damage can be included in the simulation. In particular, this interspace may provide a recirculation zone resulting in the liquid undergoing plural pumping cycles. Thus, an appropriate measure by be desired to be included in the simulation. To achieve this, a parameter called "mean volume fatigue" can be involved which allows to estimate the stress level a protein solution is exposed to at an arbitrary time-point during the aseptic fill for plural pump cycles. Fatigue is a well know parameter in material science, describing the weakening of a material after repeatedly applied use or load. The mean volume fatigue may show that after one fill cycle the shear rate levels are comparable in all three pump types used in the embodiment above. By taking into account the recirculation zone inside the piston pump 21 the repeatedly sheared volume fractions are included in the calculation and could show a cumulative mean volume fatigue for the piston pump 21, which will end up with the highest particle counts and, thus, the lowest appropriateness.

The disclosure also covers all further features shown in the Figs. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

A computer program may be stored/distributed on a suitable medium, such as an optical storage medium or a solid-state medium supplied together with or as part of other hardware, but may also be distributed in other forms, such as via the Internet or other wired or wireless telecommunication systems. In particular, e.g., a computer program can be a computer program product stored on a computer readable medium which computer program product can have computer executable program code adapted to be executed to implement a specific method such as the method according to the invention. Furthermore, a computer program can also be a data structure product or a signal for embodying a specific method such as the method according to the invention.

The invention claimed is:

1. A process of assembling a filling system for low volume filling of a liquid into a container comprising:

obtaining plural liquid forwarding devices configured to provide the liquid from a reservoir to the container;

simulating operation of each of the liquid forwarding devices by numerically modelling flow patterns of the liquid when being forwarded by the liquid forwarding devices, and by determining a shear stress rate for each of the liquid forwarding devices based on the modelled flow patterns;

determining an appropriateness for each of the liquid forwarding devices by comparing operation parameters of the liquid forwarding of the liquid forwarding devices, wherein the operation parameters include the determined shear stress rates;

selecting, from the plural liquid forwarding devices, a liquid forwarding device having the highest determined appropriateness; and installing the selected liquid forwarding device into the filling system.

2. The process of claim 1, wherein operation of each of the liquid forwarding devices is simulated by applying computational fluid dynamics using a Navier-Stokes equation, an Euler equation, a Stokes equation, a potential equation or a combination thereof.

3. The process of claim 1, wherein simulating operation of each of the liquid forwarding devices comprises defining moving parts of the liquid forwarding devices as general moving objects.

4. The process of claim 3, wherein numerically modelling flow patterns of the liquid when being forwarded by the liquid forwarding devices comprises defining displacement over time of the general moving objects.

5. The process of claim 1, wherein simulating operation of each of the liquid forwarding devices comprises defining pressure boundary conditions at liquid inlets of the liquid forwarding devices and at liquid outlets of the liquid forwarding devices.

6. The process of claim 1, wherein the operation parameters comprise liquid characteristics such as a viscosity or a sensitivity of the liquid.

7. The process of claim 1, wherein the highest determined appropriateness is the lowest shear rate.

8. The process of claim 1, wherein the liquid forwarding devices comprise a piston pump or a peristaltic pump.

9. The process of claim 1, wherein obtaining plural liquid forwarding devices comprises providing geometry data of each of the liquid forwarding devices.

10. The process of claim 9, wherein simulating operation of each of the liquid forwarding devices comprises mapping the determined shear stress rates to a geometry of each of the liquid forwarding devices represented by the provided geometry data.

11. The process of claim 9, wherein simulating operation of each of the liquid forwarding devices comprises classifying the determined shear stress rates and distributing the classified shear stress rates.

12. The process of claim 1, wherein an elastic part of any one of the liquid forwarding devices is simulated as a further liquid having a comparably high viscosity.

13. A computer implemented method of evaluating a liquid forwarding device for a filling system for low volume filling of a liquid into a container, comprising:

obtaining forwarding device data of plural liquid forwarding devices configured to provide the liquid from a reservoir to the container;

evaluating the obtained forwarding device data to simulate operation of each of the liquid forwarding devices by numerically modelling flow patterns of the liquid when being forwarded by the liquid forwarding devices, and by determining a shear stress rate for each of the liquid forwarding devices based on the modelled flow patterns;

determining an appropriateness for each of the liquid forwarding devices by comparing operation parameters of the liquid forwarding of the liquid forwarding devices, wherein the operation parameters include the determined shear stress rates; and providing an appropriateness indicator data signal representing the liquid forwarding device having the highest determined appropriateness.

14. The computer implemented method of claim 13, wherein obtaining the forwarding device data comprises receiving a device data signal for each of the forwarding devices.

15. The computer implemented method of claim 13, wherein the forwarding device data comprises geometry data of each of the liquid forwarding devices.

* * * * *